United States Patent
Chan et al.

(10) Patent No.: US 8,111,855 B2
(45) Date of Patent: Feb. 7, 2012

(54) MICROPHONE ASSEMBLY AND A PORTABLE ELECTRONIC DEVICE USING THE MICROPHONE ASSEMBLY

(75) Inventors: Kai-Po Chan, Taipei County (TW); Chao-Yuan Cheng, Taipei County (TW); Chao-Kun Tseng, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 634 days.

(21) Appl. No.: 12/330,602

(22) Filed: Dec. 9, 2008

(65) Prior Publication Data
US 2009/0304219 A1 Dec. 10, 2009

(30) Foreign Application Priority Data
Jun. 4, 2008 (CN) .......................... 2008 1 0301967

(51) Int. Cl.
*H04R 9/08* (2006.01)
*H05K 5/00* (2006.01)
*H01H 9/00* (2006.01)

(52) U.S. Cl. ........ 381/355; 381/361; 381/366; 381/390; 181/148; 181/150; 181/154; 181/158; 181/171; 200/296; 200/311; 200/341; 200/517

(58) Field of Classification Search .................. 381/355, 381/366, 390, 361; 181/148, 150, 154, 158, 181/171; 200/296, 311, 341, 517
See application file for complete search history.

(56) References Cited

U.S. PATENT DOCUMENTS
7,219,763 B2 * 5/2007 Mizoguchi et al. ........... 181/158

FOREIGN PATENT DOCUMENTS
CN 2886936 Y 4/2007
* cited by examiner

*Primary Examiner* — Long Tran
(74) *Attorney, Agent, or Firm* — Altis Law Group, Inc.

(57) ABSTRACT

A microphone assembly (10) using in a portable electronic device includes a fixing component (12) detachably fixed to a housing (30) of the portable electronic device, and a main microphone body (14) latched to the fixing component (12). The microphone assembly (10) may be conveniently detached and increases reliability of the housing (30).

15 Claims, 3 Drawing Sheets

MICROPHONE ASSEMBLY AND A PORTABLE ELECTRONIC DEVICE USING THE MICROPHONE ASSEMBLY

BACKGROUND

1. Field of the Invention

The present invention relates to a microphone assembly and a portable electronic device using the microphone assembly.

2. Description of related art

Currently, electronic devices, such as mobile phones and personal computers are often equipped with microphones. Users can transfer sound information through the microphone to receivers.

In mobile phones, the microphone is usually accommodated in the phone housing. A receiving slot is defined in the housing. The microphone can be fixed in the receiving slot by bonding or welding methods.

When the microphone is damaged, the damaged microphone needs to be removed from the housing to be replaced with a new microphone. If the shape or dimension of the new microphone is different from that of the damaged microphone, the receiving slot also needs to be changed for fitting the new microphone. However, such process is complicated and may cause damage to an inner structure of the housing thereby reducing the housing's reliability.

Therefore, there is room for improvement within the art.

DETAILED DESCRIPTION OF THE EXEMPLARY EMBODIMENTS

Figure 1:
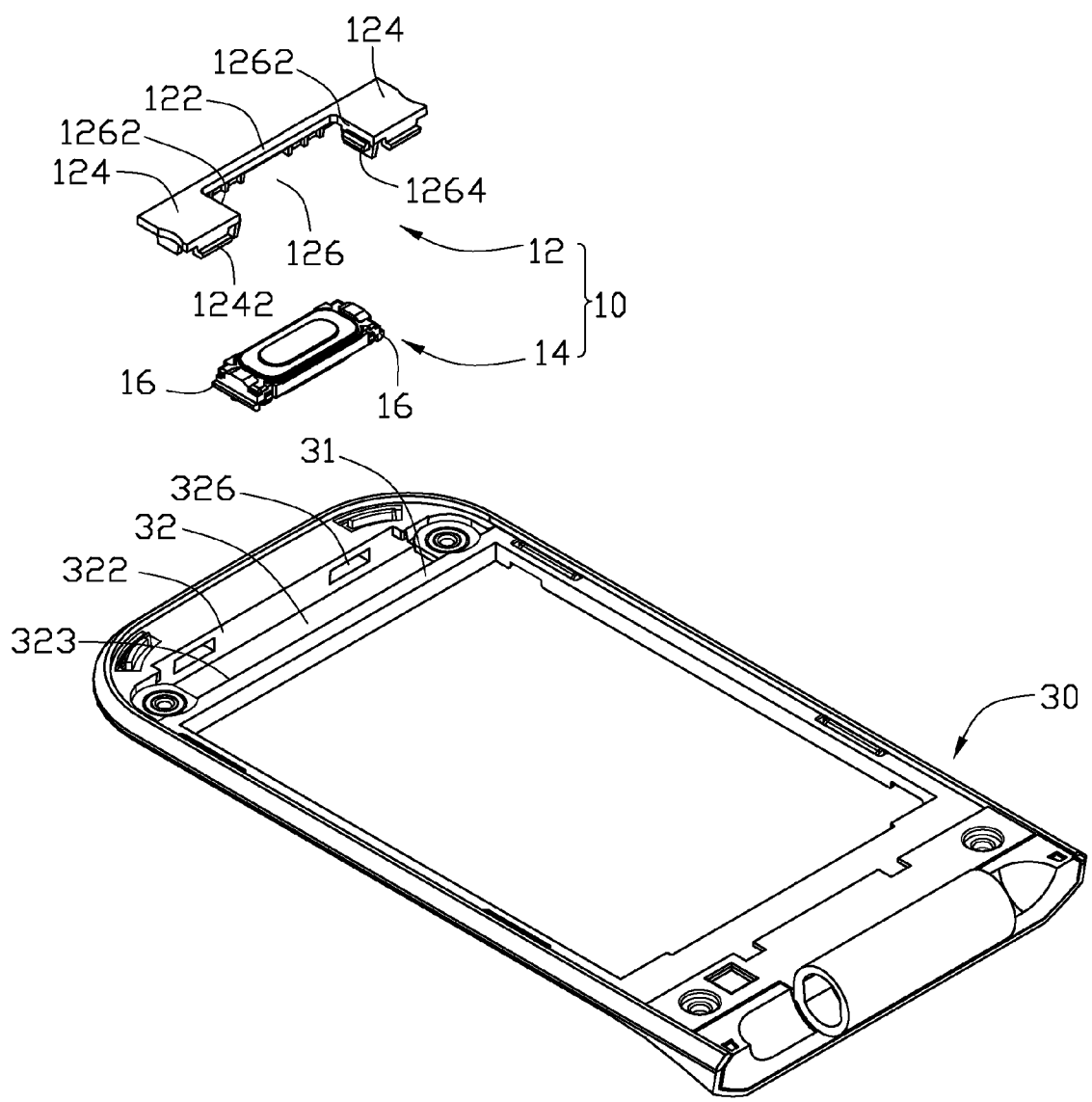
FIG. 1 is a schematic, exploded view of a housing using a microphone assembly according to an exemplary embodiment.
Figure 2:
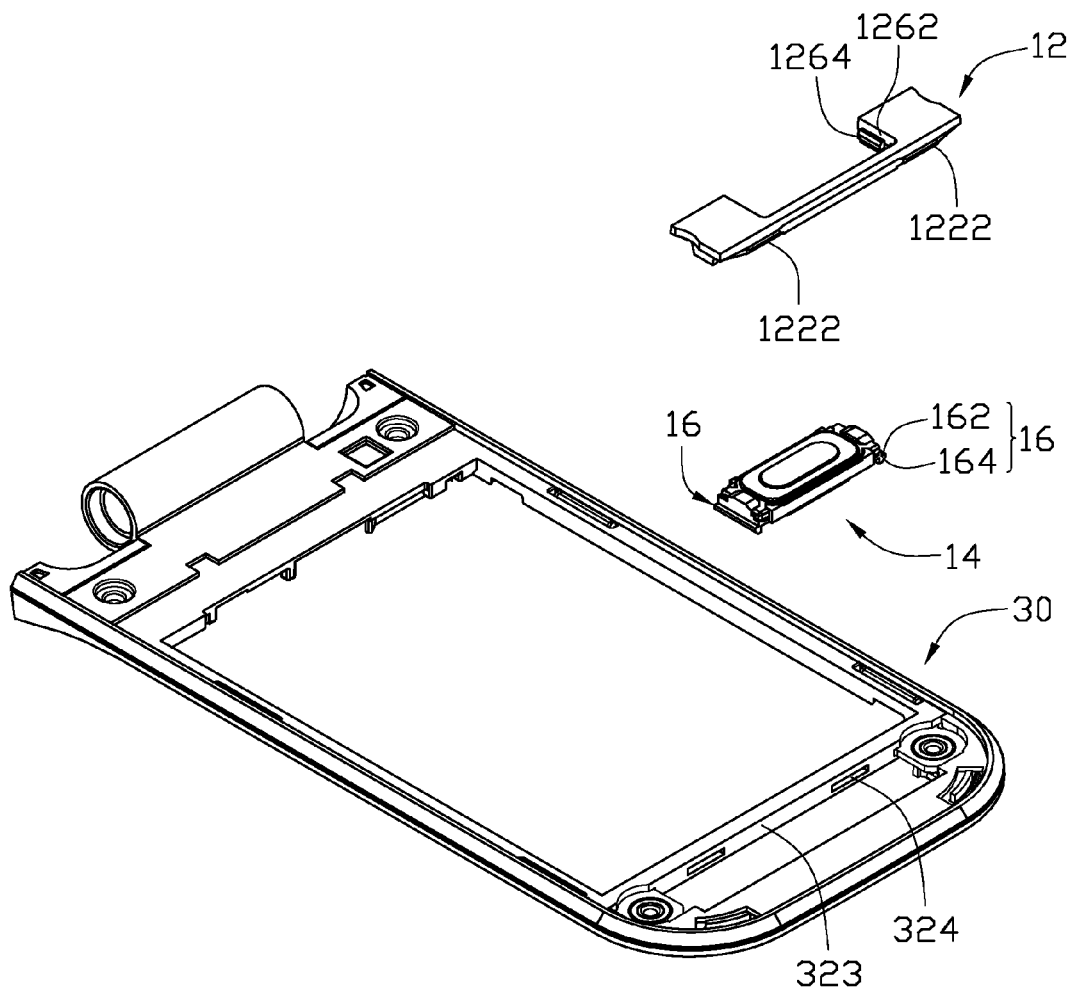
FIG. 2 is similar to FIG. 1 viewed from another angle.

FIGS. 1 and 2 show two different views of a microphone assembly 10 and a housing 30 for a mobile phone. The housing 30 includes a bottom plate 31. The bottom plate 31 has a receiving chamber 32 adjacent to an end of the bottom plate 31. The receiving chamber 32 includes a first sidewall 322 and a second sidewall 323 facing each other. The second sidewall 323 defines two grooves 324, and the first sidewall 322 defines two notches 326.

The microphone assembly 10 includes a fixing component 12 and a main microphone body 14. The fixing component 12 can be made of flexible material, e.g., rubber.

The fixing component 12 includes a connecting arm 122 and two protruding portions 124 extending from ends of the connecting arm 122. The protruding portions 124 and connecting arm 122 define a receiving opening 126. Two end walls 1262 adjacent to the receiving opening 126 have two blocks 1264 respectively positioned thereon. The connecting arm 122 includes two latching portions 1222 positioned on an opposite side thereof facing away from the protruding portions 124. The latching portions 1222 can be respectively latched into the notches 326. Two clasps 1242 are respectively positioned on an end of the protruding portions 124 orienting away from the connecting arm 122. The clasps 1242 can be respectively latched in the grooves 324.

The main microphone body 14 is substantially rectangular, and has two hooks 16 respectively positioned on two opposing ends thereof. Each free end of the hooks 16 is flexible and has a latching surface 162 and an inclined surface 164 positioned at an opposite side to the latching surface 162. When a force is applied to the inclined surface 164, the hooks 16 undergo elastic deformation. When the force is removed, each of the hooks 16 may recover its original state.

Figure 3:
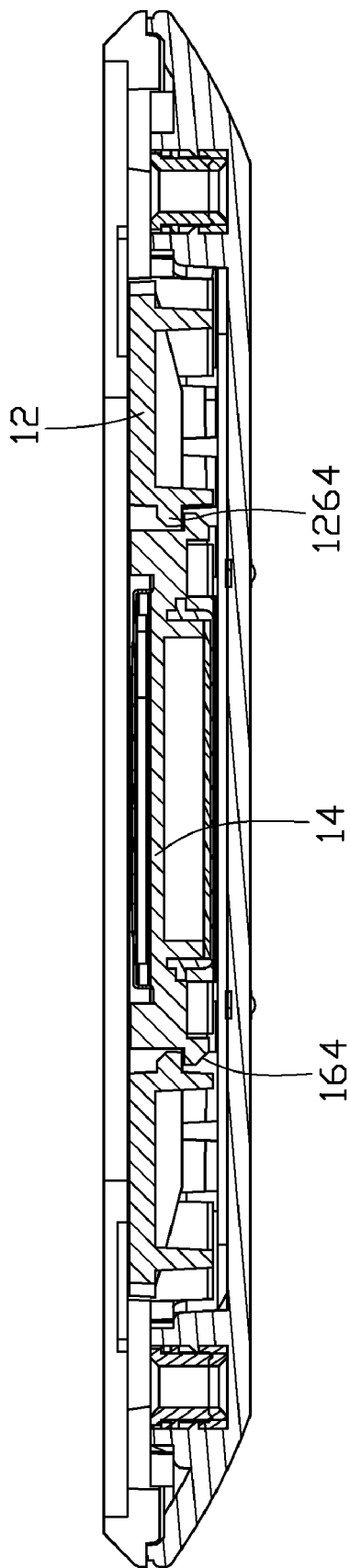
FIG. 3 is a cut-away view of the housing having the microphone assembly incorporated therein.

Referring to FIG. 3, the fixing component 12 is fixed in the receiving chamber 32 with the latching portions 1222 and clasps 1242 respectively engaging in the notches 326 and grooves 324. Furthermore, the fixing component 12 and the second sidewall 323 enclose a concave slot (not shown). Secondly, the main microphone body 14 is aligned with the concave slot and pressed downward. Therefore, the blocks 1264 respectively resist the inclined surface 164 of the hooks 16, and each of the hooks 16 undergo elastic deformation to latch with the blocks 1264.

When the microphone assembly 10 is to be disassembled, a force is applied to the fixing component 12 and the latching portions 1222 and clasps 1242 respectively deviate from the notches 326 and grooves 324, so the fixing component 12 can be removed from the receiving chamber 32. Furthermore, the hooks 16 deviate from the blocks 1264 to remove the main microphone body 14 from the receiving chamber 32.

It is to be understood that the fixing component 12 can be a closed frame structure defined an opening. The main microphone body 14 can be fixed in the opening. By having the microphone assembly include the fixing component 12 and the main microphone body 12, microphone bodies can be replaced with microphone bodies of different sizes without affecting the structure of bottom plate 21.

It is to be understood that the latching portions 1222 have the same structure as the clasps 1242. The latching portions 1222 and the clasps 1242 can be viewed as a block fixing component. Meanwhile, the notches 326 can also be taken as the grooves 324.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A microphone assembly using in a housing of electronic device, a receiving chamber defined in the housing, the receiving chamber including a first sidewall and a second sidewall facing to each other, the microphone assembly comprising:
   a main microphone body; and
   a fixing component detachably fixed in the receiving chamber, the fixing component including a connecting arm engaged with the first sidewall and two protruding portions extending from ends of the connecting arm and engaged with the second sidewall;
   wherein the two protruding portions and the connecting portion define a receiving opening, the main microphone body is latched in the receiving opening.

2. The microphone assembly as claimed in claim 1, wherein the fixing component is made of flexible material.

3. The microphone assembly as claimed in claim 1, wherein the fixing component is a frame structure.

4. The microphone assembly as claimed in claim 1, wherein two end walls adjacent to the receiving opening have two blocks respectively positioned thereon.

5. The microphone assembly as claimed in claim 4, wherein at least one hook is positioned on the main microphone body, and resisted by the blocks.

6. The microphone assembly as claimed in claim 1, wherein the first sidewall defines a plurality of notches, and the second sidewall defines a plurality of grooves.

7. The microphone assembly as claimed in claim 6, wherein a plurality of latching portions facing away from the two protruding portions are positioned on the connecting arm and are respectively engaged in the plurality of notches, and a plurality of clasps orienting away from the connecting arm are positioned on the two protruding portions and are respectively engaged in the plurality of grooves.

8. The microphone assembly as claimed in claim 1, wherein the fixing component and the second sidewall enclose a slot, and the main microphone body is received in the slot.

9. The microphone assembly as claimed in claim 1, wherein the connecting arm and the two protruding portions are substantially co-planar.

10. A portable electronic device comprising:
a housing defining a receiving chamber, the receiving chamber including a first sidewall and a second sidewall facing to each other; and
a microphone assembly received in the receiving chamber comprising:
a fixing component detachably fixed in the receiving chamber, the fixing component including a connecting arm engaged with the first sidewall and two protruding portions extending from ends of the connecting arm and engaged with the second sidewall, the two protruding portions and the connecting portion define a receiving opening;
a main microphone body latched in the receiving opening.

11. The portable electronic device as claimed in claim 10, wherein the first sidewall defines a plurality of notches, and the second sidewall defines a plurality of grooves.

12. The portable electronic device as claimed in claim 11, wherein a plurality of latching portions facing away from the two protruding portions are positioned on the connecting arm and are respectively engaged in the plurality of notches, and a plurality of clasps orienting away from the connecting arm are positioned on the two protruding portions and are respectively engaged in the plurality of grooves.

13. The portable electronic device as claimed in claim 12, wherein the fixing component is made of flexible material.

14. The portable electronic device as claimed in claim 10, wherein the fixing component and the second sidewall enclose a slot, and the main microphone body is received in the slot.

15. The portable electronic device as claimed in claim 10, wherein the connecting arm and the two protruding portions are substantially co-planar.

* * * * *